（12）United States Patent
Kasper et al.

(10) Patent No.: US 11,767,004 B2
(45) Date of Patent: Sep. 26, 2023

(54) APPARATUS AND METHOD FOR TRAILER SERVICE BRAKE CONTROL

(71) Applicant: Bendix Commercial Vehicle Systems LLC, Elyria, OH (US)

(72) Inventors: Phillip J Kasper, Elyria, OH (US); David J Taneyhill, Elyria, OH (US); Paul C Niglas, Avon, OH (US); Gerhard Wieder, Besigheim (DE); Arnav Vasudev, Avon, OH (US); Christopher H Hutchins, Bay Village, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 482 days.

(21) Appl. No.: 17/012,352

(22) Filed: Sep. 4, 2020

(65) Prior Publication Data
US 2020/0398806 A1 Dec. 24, 2020

Related U.S. Application Data

(63) Continuation of application No. 15/955,175, filed on Apr. 17, 2018, now Pat. No. 10,780,872.

(51) Int. Cl.
| B60T 15/04 | (2006.01) |
| B60D 1/62 | (2006.01) |
| B60D 1/26 | (2006.01) |
| B60T 7/08 | (2006.01) |
| B60T 8/172 | (2006.01) |
| B60T 8/72 | (2006.01) |
| B60T 8/34 | (2006.01) |

(Continued)

(52) U.S. Cl.
CPC .............. *B60T 15/043* (2013.01); *B60D 1/26* (2013.01); *B60D 1/62* (2013.01); *B60T 7/085* (2013.01); *B60T 8/172* (2013.01); *B60T 8/1708* (2013.01); *B60T 8/342* (2013.01); *B60T 8/36* (2013.01); *B60T 8/72* (2013.01); *B60T 7/107* (2013.01)

(58) Field of Classification Search
None
See application file for complete search history.

(56) References Cited

U.S. PATENT DOCUMENTS

2015/0232078 A1\* 8/2015 Nagura ................. B60T 15/203
701/33.9

FOREIGN PATENT DOCUMENTS

| DE | 102016011390 A1 * | 3/2018 | .............. B60T 13/38 |
| EP | 1538054 A2 * | 6/2005 | .............. B60T 13/04 |
| WO | WO-2016198152 A1 * | 12/2016 | .............. B60T 13/38 |

\* cited by examiner

*Primary Examiner* — Melanie Torres Williams
(74) *Attorney, Agent, or Firm* — Brian E. Kondas; Cheryl L. Greenly; Eugene E. Clair

(57) ABSTRACT

A system on a tractor for controlling trailer service brakes comprises a manually operated trailer brake switch, a first electropneumatic valve in communication with a pressure source and a controller. The controller has an input communicating with the trailer brake switch, an output communicating with the electropneumatic valve and control logic. The control logic receives an input from the trailer brake switch indicating a driver's request to apply the trailer service brakes of the combination vehicle, determines if a predetermined condition exists and transmits a signal to the output to the electropneumatic valve. The electropneumatic valve transmits pressure to a trailer service control line to actuate the trailer service brakes in response to the trailer brake switch and existence of the predetermined condition.

20 Claims, 3 Drawing Sheets

(51) Int. Cl.
*B60T 8/36* (2006.01)
*B60T 8/17* (2006.01)
*B60T 7/10* (2006.01)

APPARATUS AND METHOD FOR TRAILER SERVICE BRAKE CONTROL

BACKGROUND

The present invention relates to examples of a control device for trailer service brakes and method of controlling trailer service brakes. Today's air brake systems on commercial vehicles include multiple pneumatic valves used to provide air to the service brakes of both the tractor and the trailer. One example valve to actuate the trailer service brakes is a trailer control valve, such as the TCS-9000™ control brake valve available from Bendix Commercial Vehicle Systems LLC, Elyria Ohio. The trailer control valve is located in the cab of a tractor and includes a handle. The driver of the commercial vehicle activates this valve when he wants to operate the trailer service brakes independently of the tractor service brakes. The air control lines must be routed through the dash of the cab in order for the driver to actuate the trailer service brakes by hand. In some safety situations, drivers should not be permitted to activate only the trailer service brakes. There is a need to eliminate air running through the dash of commercial vehicles while still maintaining driver features, such as independent control of the trailer service brakes, in limited situations.

SUMMARY

Various examples of a system on a tractor for controlling trailer service brakes comprises a manually operated trailer brake switch, a first electropneumatic valve in communication with a pressure source and a controller. The controller has an input communicating with the trailer brake switch, an output communicating with the first electropneumatic valve and control logic. The control logic receives an input from the trailer brake switch indicating a driver's request to apply the trailer service brakes of the combination vehicle, determines if a predetermined condition exists and transmits a signal to the output to the first electropneumatic valve, wherein the first electropneumatic valve transmits pressure to a trailer service control line to actuate the trailer service brakes in response to the trailer brake switch and existence of the predetermined condition.

Various examples of a system on a tractor for controlling trailer service brakes comprise a manually operated trailer brake switch and a controller. The control logic of the controller receives an input from the trailer brake switch indicating a driver's request to apply the trailer service brakes of the combination vehicle, determines if a predetermined condition exists and transmits pressure to a trailer service control line to actuate the trailer service brakes in response to the trailer brake switch and existence of the predetermined condition.

Various examples of a method for controlling trailer service brakes comprises receiving an input from a trailer brake switch indicating a request to apply trailer service brakes, determining whether the vehicle meets a predetermined condition and transmitting a signal to the output to an electropneumatic valve to actuate the trailer service brakes in response to the activation of the trailer brake switch and the speed being less than a predetermined speed.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
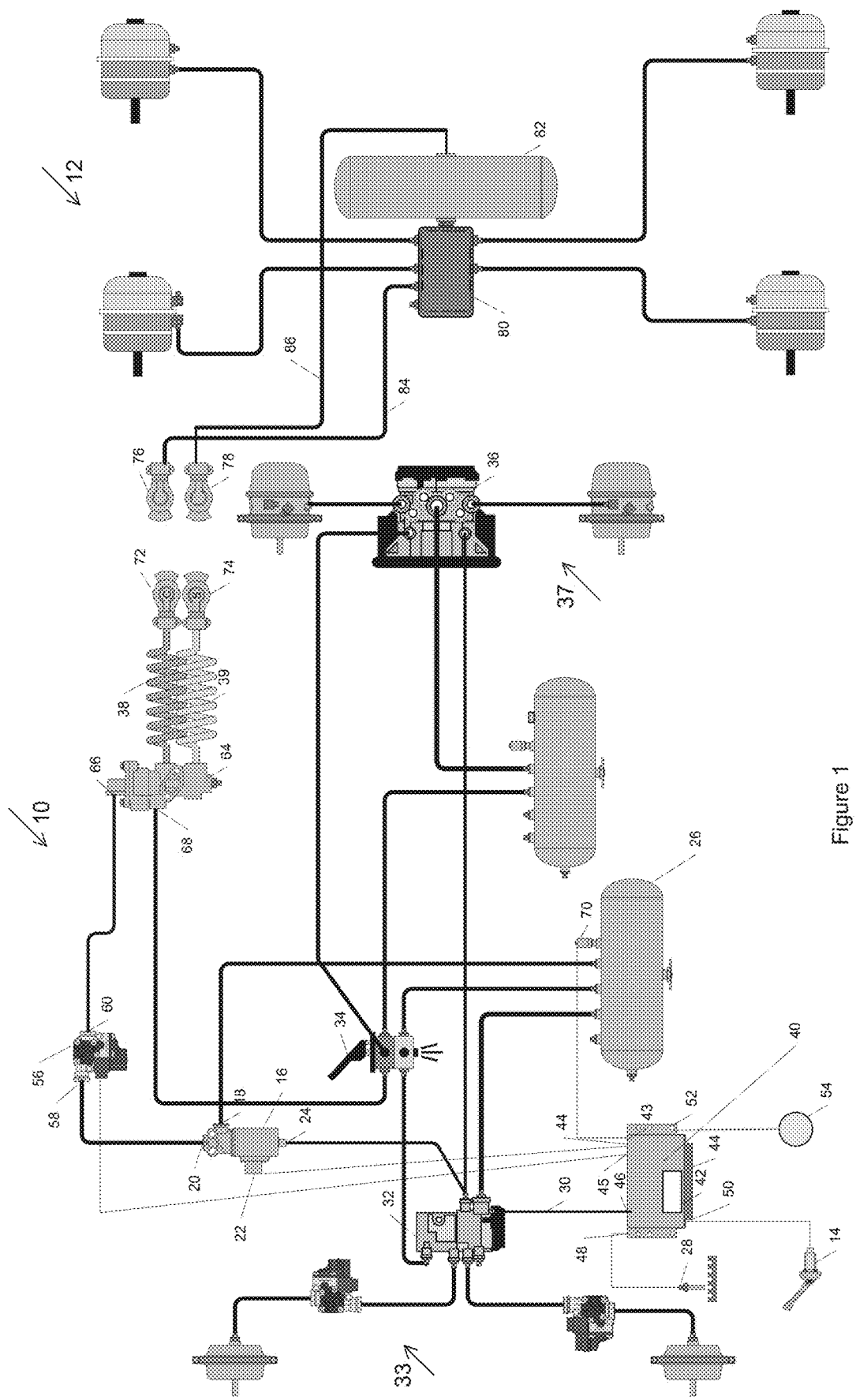
FIG. 1 illustrates a schematic representation of an example tractor service braking system and a trailer service braking system on a commercial vehicle.

With reference to FIG. 1, a tractor service braking system 10 and trailer service braking system 12 of an air braked commercial vehicle is illustrated.

The tractor system 10 includes a service brake foot valve 34 for receiving a driver's request to stop or slow the entire vehicle. The foot valve 34 receives supply air pressure from a reservoir 26 and delivers the driver requested delivery pressure to a front axle valve 32, a rear axle valve 36 and a first input 68 of a tractor protection valve 64. The front axle valve 32 will deliver the pressure to the front service brakes 33, the rear axle valve 36 will deliver the pressure to the rear axle service brakes 37 and the tractor protection valve 64 will deliver the pressure to the trailer service braking system 12.

The tractor service braking system 10 communicates with the trailer service braking system 12 through the tractor protection valve 64. The tractor protection valve 64 has the first input 68 and a second input 66. The tractor protection valve 64 communicates the control pressure of the highest value of either the first input 68 or the second input 66 to the trailer system 12 while protecting the air in the tractor system 10 in case of separation of the connection between the tractor system 10 and trailer system 12. The tractor protection valve 64 communicates with a trailer control pressure line 38. The trailer control pressure line 38 communicates via gladhand 72 to gladhand 76 of the trailer system 12. Gladhand 76 communicates with the trailer control pressure line 84 of the trailer system 12. The tractor protection valve 64 communicates with a trailer supply pressure line 39. The trailer supply pressure line 39 communicates with gladhand 74 to gladhand 78 of the trailer system 12. Gladhand 78 communicates with the trailer supply pressure line 86.

In the trailer system 12, the trailer supply pressure line 86 communicates with a trailer reservoir 82. The trailer control pressure line 84 communicates with a trailer control valve device 80 mounted on the trailer. The control valve device 80 performs service braking functions. The service brakes on the trailer are actuated in response to the pressure received on the trailer control pressure line 84 as long as sufficient pressure is available in the trailer reservoir 82.

The tractor system 10 includes a trailer control switch 14. The trailer control switch 14 is manually operated by a driver from inside a cab of the tractor. The trailer control switch 14 is electronic and may be a two state switch or alternatively a three state switch with on-hold-off states. The trailer control switch 14 may be installed in a dashboard panel or may be attached to the steering column. The trailer control switch 14 is used by the driver when he only wants to apply the trailer service brakes and not the tractor service brakes.

The tractor system 10 includes a first electropneumatic valve 16. The first electropneumatic valve may be a 3/2 solenoid operated valve. The first electropneumatic valve 16 receives supply air pressure from the reservoir 26 at a supply input 18. The first electropneumatic valve 16 communicates pneumatically with the front axle valve 32 at input 24 and transmits control pressure at output 20 to the second input 66 of the tractor protection valve 64.

The tractor system 10 may include a second electropneumatic valve 56. The second electropneumatic valve 56 may be an anti-lock brake system pressure modulator valve. An input 58 of the second electropneumatic valve 56 would communicate pneumatically with the output 20 of the first electropneumatic valve 16. An output 60 would communication with the second input 66 of the tractor protection valve 64.

The tractor system 10 includes a controller 40. The controller 40 includes a processor with control logic 42 for receiving and transmitting messages. The control logic 42 may also receive sensor signals and transmit control signals to control the tractor service brake system 10 of the vehicle. The control logic 42 may include volatile, non-volatile memory, solid state memory, flash memory, random-access memory (RAM), read-only memory (ROM), electronic erasable programmable read-only memory (EEPROM), variants of the foregoing memory types, combinations thereof, and/ or any other type(s) of memory suitable for providing the described functionality and/or storing computer-executable instructions for execution by the control logic 42. The controller 40 may perform anti-lock brake functions, stability control functions and automated driver assist functions. In one example, the controller 40 may be integrated with another vehicle controller on the tractor.

The controller 40 receives signals at input 50 from the trailer control switch 14. The input indicates a driver's desire to actuate the service brakes of the trailer system 12 independent of the tractor service brakes. Alternatively, the controller 40 receives the request via a serial vehicle communications bus 30 or from a source other than the driver.

The controller 40 receives signals at input 48 from a wheel speed sensing device, illustrated as wheel speed sensor 28. It is understood that more than one wheel speed sensor may be installed as part of the tractor system 10 in order to determine vehicle speed. Each wheel speed sensor is connected to the controller 40. The control logic 42 determines vehicle speed in response to the wheel speed sensor signals. Alternatively, the controller 40 includes a communications port 46 and communicates on the vehicle communications bus 30 to receive the vehicle speed from another source, such as the engine.

The controller 40 receives signals at input 43 from a pressure sensing device, illustrated as pressure sensor 70. The pressure sensor 70 is in pneumatic communication with the reservoir 26. The control logic 42 determines available supply pressure in response to the pressure signal. It is understood that more than one pressure sensor may installed as part of the tractor system 10 in order to determine available supply pressure. Each pressure sensor is connected to the controller 40. Alternatively, the controller 40 communicates on the vehicle communications bus 30 to receive the pressure information from another source, such as a vehicle electronic air control system.

The controller 40 electrically communicates with the front axle valve 32 and the rear axle valve 36 to autonomously actuate the tractor service brakes in certain stability control situations. The controller 40 may communicate control signals via the vehicle communications bus 30 or via dedicated outputs to each valve.

The controller 40 electrically communicates with the first electropneumatic valve 16 at the output 44 to actuate the trailer service brakes in situations where the driver may request a trailer service brake actuation but not a tractor service brake application. No input is required from the foot valve 34. The controller 40 receives a signal at input 50 from the trailer brake switch 14 in response to the driver's request to only actuate the trailer service brakes. These situations may occur when a tractor driver is positioning the tractor to be mechanically connected to the trailer or when the driver desires to perform a pre-trip inspection of the trailer service braking system.

The controller 40 transmits a control signal at output 44 in response to the request to actuate only the trailer service brakes. The first electropneumatic valve 16 opens a path from the reservoir 26 to output 20 to provide supply pressure, thereby delivering control pressure to the tractor protection valve 64. The tractor protection valve 64 will transmit the control pressure to tractor control line 38 and onto the trailer service brake system 12 as long as a trailer is connected to the tractor. The controller 40 will also discontinue the signal to the first electropneumatic valve 16 when actuation of the trailer service brakes is no longer desired by the driver based on the input from the trailer brake switch 14 or when certain predetermined conditions are not met.

In instances where fine pressure control or less than full supply pressure is desired at the trailer service brakes, the controller 40 electrically communicates at output 45 with the second electropneumatic valve 56. Full pressure may be desired if the vehicle is on an incline, but may not be necessary if the vehicle is on a flat surface. Reducing the pressure to the brake system will preserve the life of the brake components. The second electropneumatic valve 56 will receive the control pressure from the first electropneumatic valve 16 and cycle the solenoids to provide varying amounts of air to the second input 66 of the tractor protection valve 64. The tractor protection valve 64 will transmit the control pressure to the tractor control line 38 and into the trailer service brake system 12 as long as a trailer is connected to the tractor. Alternatively, a pneumatic only pressure reduction valve could be used in place of the second electropneumatic valve 56.

The controller 40 may also communicate with an indicator 54. The indicator 54 may be a lamp in the dash of the vehicle or a dashboard display. The indicator 54 shows the driver the operating state of the trailer service brake system.

Therefore, a system on a tractor for controlling trailer service brakes comprises a manually operated trailer brake switch, a first electropneumatic valve in communication with a pressure source and a controller. The controller has an input communicating with the trailer brake switch, an output communicating with the first electropneumatic valve and control logic. The control logic receives an input from the trailer brake switch indicating a driver's request to apply the trailer service brakes of the combination vehicle; determines if a predetermined condition exists, and transmits a signal to the output to the first electropneumatic valve, wherein the first electropneumatic valve transmits pressure to a trailer service control line to actuate the trailer service brakes in response to the trailer brake switch and existence of the predetermined condition.

Figure 2:
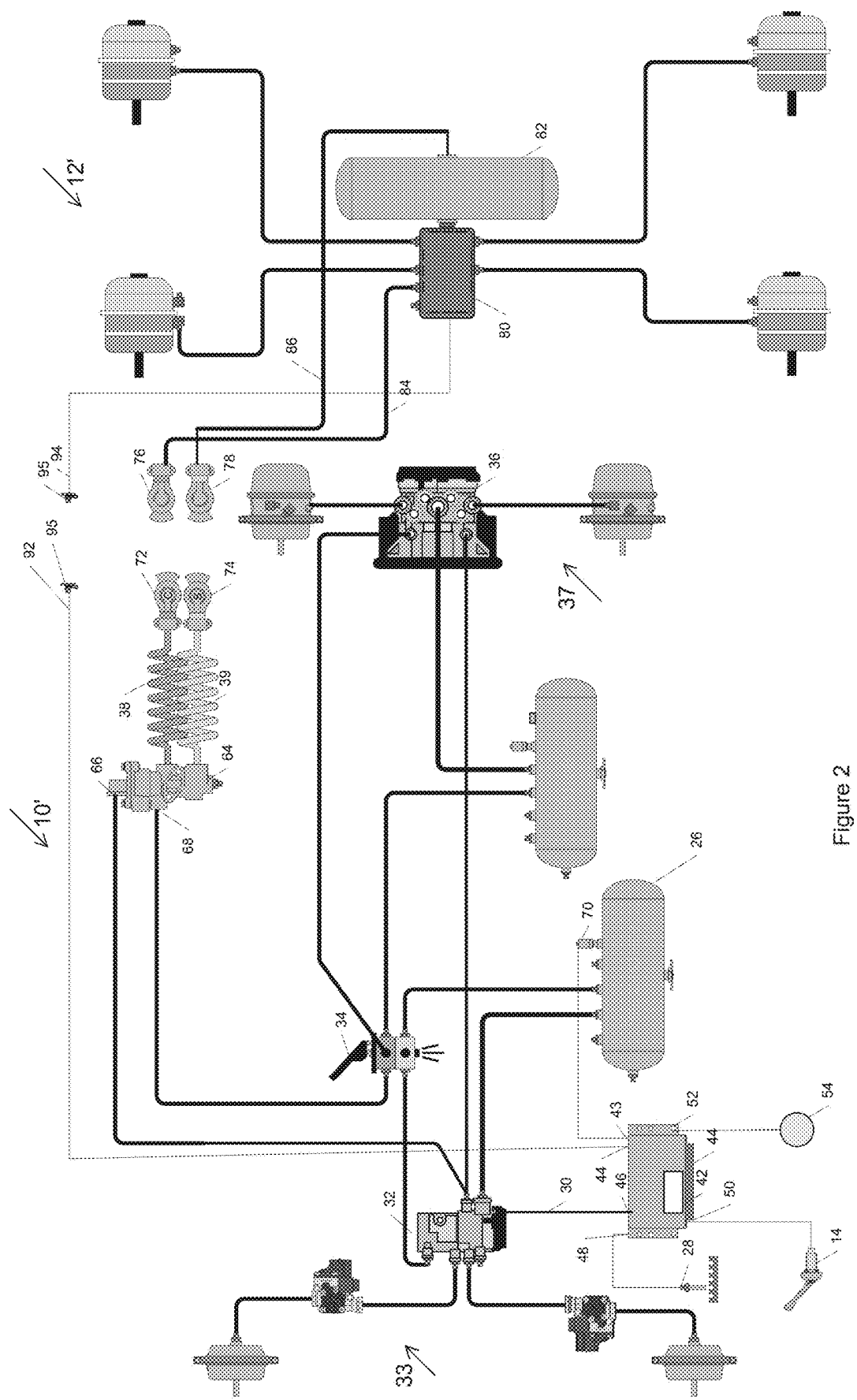
FIG. 2 illustrates a schematic representation of a tractor service braking system and a trailer service braking system on a commercial vehicle according to another example.

With reference to FIG. 2, a tractor service braking system 10' and a trailer service braking system 12' of an air braked commercial vehicle showing another example embodiment of the invention is illustrated. Elements that are the same as in FIG. 1 have the same numbers.

The tractor system 10' includes the service brake foot valve 34 for receiving a driver's request to stop or slow the vehicle. The foot valve 34 receives supply air pressure from the reservoir 26 and delivers the driver requested delivery pressure to the front axle valve 32, the rear axle valve 36 and the first input 68 of the tractor protection valve 64. The front axle valve 32 will deliver the pressure to the front service brakes 33 as well as to the second input of the tractor protection valve 64. The rear axle valve 36 will deliver the pressure to the rear axle service brakes 37 and the tractor protection valve 64 will deliver the pressure to the trailer service braking system 12'.

The tractor service braking system 10' communicates with the trailer service braking system 12' through the tractor protection valve 64. The tractor protection valve 64 communicates the control pressure at either the first input 68 or the second input 66 having the highest pressure value to the trailer system 12' while protecting the tractor system 10' in case of separation of the connection between the tractor system 10' and trailer system 12'. The tractor protection valve 64 communicates with the trailer control pressure line 38. The trailer control pressure line 38 communicates via gladhand 72 to gladhand 76 of the trailer system 12'. Gladhand 76 communicates with the trailer control pressure line 84. The tractor protection valve 64 communicates with a trailer supply pressure line 39. The trailer supply pressure line 39 communicates with gladhand 74 to gladhand 78 of the trailer. Gladhand 78 communicates with the trailer supply pressure line 86.

The trailer supply pressure line 86 communicates with a trailer reservoir 82. The trailer control pressure line 84 communicates with a control valve device 80 mounted on the trailer. The control valve device 80 performs service braking functions. The service brakes on the trailer are actuated in response to the pressure received on the trailer control pressure line 84 or automatically in response to a signal from the tractor system 10', as will be disclosed.

The tractor system 10' includes the trailer control switch 14. The trailer control switch 14 is manually operated by a driver from inside a cab of the tractor. The trailer control switch 14 is electronic and may be a two state switch or alternatively a three state switch with on-hold-off states. The trailer control switch 14 may be installed in a dashboard panel or may be attached to the steering column. The trailer control switch 14 is used by the driver when he only wants to apply the trailer service brakes and not the tractor service brakes.

The tractor system 10' includes the controller 40. The controller 40 includes a processor with control logic 42 for receiving and transmitting messages. The control logic 42 may also receive sensor signals and transmit control signals to control the tractor service brake system 10' and the trailer service brake system 12' of the vehicle. The control logic 42 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 42. The controller 40 may perform anti-lock brake functions, stability control functions and automated driver assist functions.

The controller 40 receives signals at input 48 from the wheel speed sensing device, illustrated as wheel speed sensor 28. It is understood that more than one wheel speed sensor may be installed as part of the tractor system 10 in order to determine vehicle speed. Each wheel speed sensor is connected to the controller 40. The control logic 42 determines vehicle speed in response to the wheel speed sensor signals. Alternatively, the controller 40 includes a communications port 46 and communicates on a vehicle communications bus 30 to receive the vehicle speed from another source, such as the engine.

The controller 40 receives signals at input 43 from the pressure sensing device, illustrated as pressure sensor 70. The pressure sensor 70 is in pneumatic communication with the reservoir 26. The control logic 42 determines available supply pressure in response to the pressure signal. It is understood that more than one pressure sensor may installed as part of the tractor system 10' in order to determine available supply pressure. Each pressure sensor is connected to the controller 40. Alternatively, the controller 40 communicates on the vehicle communications bus 30 to receive the pressure information from another source, such as a vehicle electronic air control system.

The controller 40 electrically communicates with the front axle valve 32 and the rear axle valve 36 to autonomously actuate the tractor service brakes in certain stability control situations. The controller 40 may communicate control signals via the communications bus 30 or via a dedicated output.

The tractor system 10' includes a communication line 92. The communication line may be a controller area network line or a power line carrier bus that will transmit control signals on the communication line 92 of the tractor system 10' through an electrical connector 95 to the communication line 94 of the trailer system 12'. The controller 40 electrically communicates with the trailer control valve 80 via the communication line 92. Alternatively, the controller 40 may communicate wirelessly with the trailer control valve 80. The controller 40 will transmit a signal or message such that the trailer control valve 80 will respond by actuating the trailer service brakes. No pneumatic signal is transmitted between the tractor system 10' and the trailer system 12'. Fine pressure control of the trailer system 12' can be achieved by changing the transmitted signal or the messages.

The controller 40 may also communicate with the indicator 54. The indicator 54 may be a lamp in the dash of the vehicle or a dashboard display. The indicator 54 shows the driver the operating state of the trailer service brake system 12'.

Figure 3:
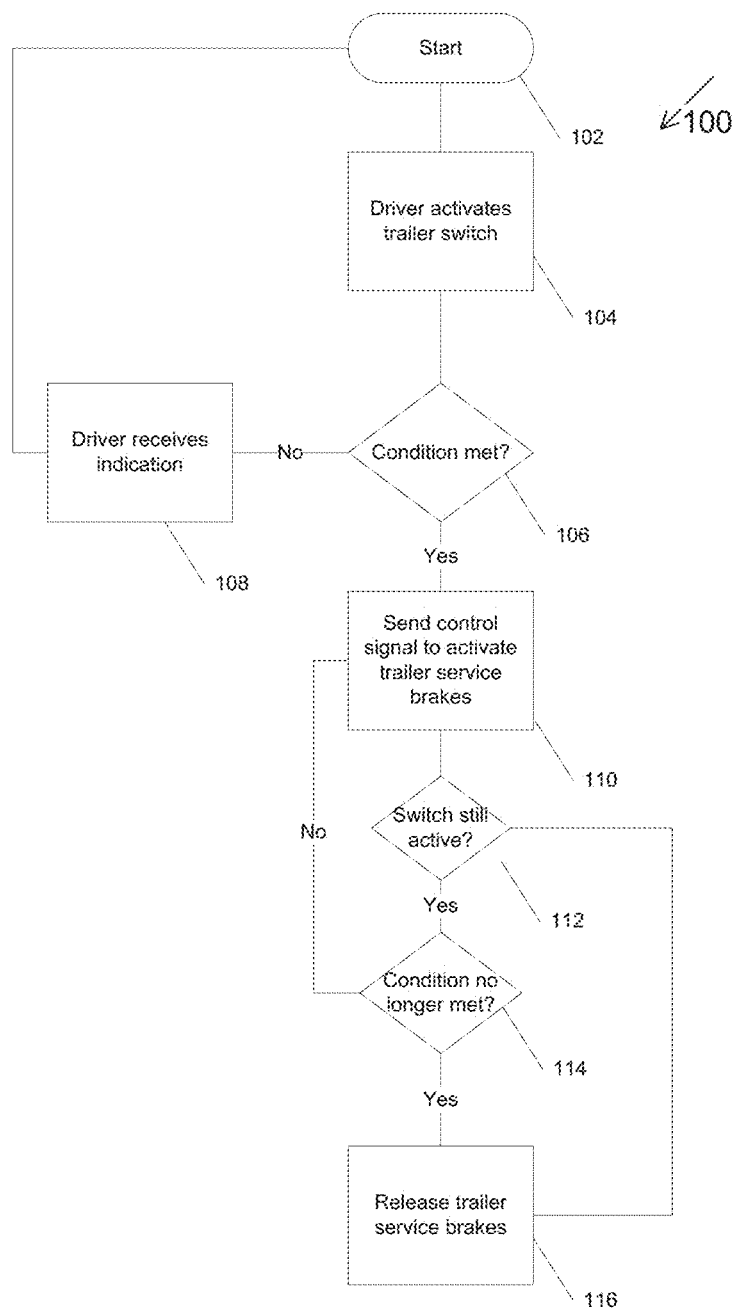
FIG. 3 illustrates a method of operating the trailer service brakes according to an example of the present invention.

FIG. 3 illustrates a flowchart for implementing a method 100 of controlling the trailer service brakes using the systems of FIG. 1. The method 100 begins at step 102. In step 104, the driver activates the trailer brake switch 14, indicating his desire to apply only the trailer service brakes.

In step 106, the control logic 42 determines if a predetermined condition is met. In one example, the predetermined condition is whether the speed of the tractor is less than a predetermined speed. The predetermined speed may be about five miles per hour. This low speed ensures that the tractor is fully stopped or nearly stopped. In another example, the predetermined condition is a pressure value from the pressure sensor being greater than a predetermined pressure. The predetermined pressure may be about sixty psi. Other examples of predetermined conditions include the presence of a trailer, the trailer parking brake status, such that if the trailer is parked, there is no need to activate trailer service brakes, and whether the transmission is in neutral or low gear. In addition, a geofence may be implemented to prevent the service brake activation outside the geofence.

In another example, the control logic 42 may consider a time out as a predetermined condition. The control logic 42 would not allow the trailer service brakes to be activated for longer than a predetermined period of time after the trailer brake switch 14 is activated. Each of the initial predetermined conditions must still be met to allow the service brakes to be applied. The predetermined period of time may be between one and three minutes. Other implementations of predetermined conditions are also possible.

In one example, if none of the predetermined conditions are met and there is no additional driver intervention, the trailer service brakes are released and the trailer parking brakes would be automatically applied to ensure that the trailer remains stationary.

If the predetermined condition is not met, the driver receives an indication in step 108. The indication may be via the indicator 54. The indicator 54 may be lit only when the trailer service braking system 12 is actuated and may blink if a request for service brakes was made via the trailer brake switch 14 but the predetermined condition was not met. Other methods of indicating the status of the trailer service braking system to the driver, such as LCD displays and audible means are contemplated. The method 100 then returns to the start step 102.

If the predetermined condition is met, the method 100 continues to step 110. In another example, one or more of the predetermined conditions must be met. The control logic 42 transmits a control signal to activate the trailer service brakes. The control signal includes transmitting a signal at output 44 to activate the first electropneumatic valve 16 so that air pressure will flow to the second input 66 of the tractor protection valve 64, through the tractor control line 38 and into the trailer control line 84.

If the second electropneumatic valve 60 is present in the system, then the control logic 42 will transmit a signal to both the first electropneumatic valve 16 and the second electropneumatic valve 56. The signal to the second electropneumatic valve 56 is adjusted, such as pulse width modulated, to provide less than the full available delivery pressure to the trailer service braking system 12. The control logic 42 will maintain the trailer service brakes as actuated as long as the trailer brake switch 14 is in the active state, a predetermined condition is no longer met or until the trailer brake switch 14 is moved to the off position if the trailer brake switch 14 returns to neutral after actuation. Alternatively, the function of the second electropneumatic valve to deliver a tunable pressure value can be combined into the first electropneumatic valve 16 such that only one valve is used.

The control logic 42 continuously monitors the vehicle conditions, such as speed and supply pressure. If the vehicle condition changes such that the predetermined condition is no longer met as in step 112, the trailer service brakes are released in step 114 where the control logic no longer transmits a signal to the first electropneumatic valve 16 or the second electropneumatic valve 56, which will discontinue the control pressure supplied to the trailer service braking system 12. In one example, if none of the predetermined conditions are met and there is no additional driver intervention, the trailer parking brakes would be automatically applied to ensure that the trailer remains stationary.

With this method of operating the trailer service brakes, the driver cannot abuse the trailer service braking system by using the trailer service brakes during on the road driving situations since the operation is limited to low speed operation. The trailer service brakes will not be activated if the available pressure is not at a predetermined minimum. Neither will the driver be able to leave the trailer service brakes activated indefinitely using the system of the present invention.

Therefore a method of controlling trailer service brakes comprises receiving an input from a trailer brake switch indicating a request to apply trailer service brakes; determining whether the vehicle meets a predetermined condition; transmitting a signal to the output to an electropneumatic valve to actuate the trailer service brakes in response to the activation of the trailer brake switch and the speed being less than a predetermined speed.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for controlling a pressure at a trailer control pressure line on a tractor portion of an associated vehicle, the controller comprising:
    an input electrically communicating with a trailer brake switch on a tractor portion of an associated vehicle;
    a processor operatively coupled to the input;
    a memory, operatively coupled to the processor, including control logic executable by the processor to:
        process a trailer control request signal, received by the input from a trailer brake switch, transmitted in response to the trailer brake switch receiving a request to actuate the trailer service brake on a trailer portion of an associated vehicle;
        generate a first trailer service brake control signal based on the trailer control request signal; and
        generate a second trailer service brake control signal based on a requested pressure included in the trailer control request signal, the requested pressure being up to a full pressure of pressurized air in an associated tractor reservoir on the tractor portion of the associated vehicle; and
    an output, operatively coupled to the processor, transmitting the first trailer service brake control signal and the second trailer service brake control signal for controlling fluid communication of pressurized air from the tractor reservoir to an associated trailer control pressure line on the tractor portion.

2. The controller for controlling a pressure at a trailer control pressure line as set forth in claim 1, wherein:
    the first trailer service brake control signal is transmitted to a first electro-pneumatic valve, the first electro-pneumatic valve fluidly communicating the pressurized air from the reservoir to the trailer control pressure line based on the first trailer service brake control signal.

3. The controller for controlling a pressure at a trailer control pressure line as set forth in claim 2, wherein:
    the second trailer service brake control signal is transmitted to a second electro-pneumatic valve, the second electro-pneumatic valve varying the pressurized air from the reservoir to the trailer control pressure line based on the second trailer service brake control signal.

4. The controller for controlling a pressure at a trailer control pressure line as set forth in claim 3, wherein:

if the requested pressure is less than a full pressure of the pressurized air in the trailer reservoir, the second trailer service brake control signal causes the second electropneumatic valve to modulate for causing less than the full pressure of the pressurized air in the tractor reservoir to be fluidly communicated with the trailer service brake control valve.

5. The controller for controlling a pressure at a trailer control pressure line as set forth in claim 1, wherein:
the trailer brake switch is actuated by a driver of the associated vehicle to transmit the trailer control request signal.

6. The controller for controlling a pressure at a trailer control pressure line as set forth in claim 5, wherein:
the trailer brake switch is actuated by the driver of the associated vehicle to transmit the trailer control request signal when the driver desires to only actuate the trailer service brake.

7. The controller for controlling a pressure at a trailer control pressure line as set forth in claim 1, wherein:
the trailer brake switch is manually operated by a driver of the associated vehicle.

8. A system for controlling a trailer service brake, the system comprising:
a controller on a tractor portion of an associated vehicle, the controller including:
an input electrically communicating with a trailer brake switch on the tractor portion;
a processor operatively coupled to the input;
a memory, operatively coupled to the processor, including control logic executable by the processor to:
process a trailer control request signal, received by the input from a trailer brake switch, transmitted in response to the trailer brake switch receiving a request to actuate the trailer service brake on a trailer portion of an associated vehicle; and
generate a trailer service brake control signal based on the trailer control request signal; and
an output, operatively coupled to the processor, transmitting the trailer service brake control signal for controlling fluid communication of pressurized air from an associated reservoir on a trailer portion of the vehicle to an associated brake on the trailer portion; and
a trailer control valve device on a trailer portion of the associated vehicle, the trailer control valve device including:
an electrical input, communicating with the output of the controller, receiving the trailer service brake control signal;
a pneumatic output fluidly communicating the pressurized air from the reservoir to the brake based on the trailer service brake control signal.

9. The system for controlling a trailer service brake as set forth in claim 8, wherein:
the brake is actuated to achieve a desired braking level based on a varied amount of the pressurized air fluidly communicated from the reservoir to the brake.

10. The system for controlling a trailer service brake as set forth in claim 9, wherein:
the trailer control request signal indicates the desired braking level.

11. The system for controlling a trailer service brake as set forth in claim 10, wherein:
the controller generates the trailer service brake control signal based the desired braking level.

12. A system for transmitting a service brake control signal, the system comprising:
a controller on a tractor portion of an associated vehicle, the controller including:
an input electrically communicating with a trailer control switch on the tractor portion;
a processor operatively coupled to the input;
a memory, operatively coupled to the processor, including control logic executable by the processor to:
process a trailer control request signal, received by the input from a trailer contril switch, transmitted in response to the trailer control switch receiving a request to actuate a service brake on the associated vehicle; and
generate the service brake control signal based on the trailer control request signal; and
an output, operatively coupled to the processor, transmitting the service brake control signal for controlling the service brake on the associated vehicle.

13. The system for transmitting a service brake control signal as set forth in claim 12, wherein:
the service brake is actuated to achieve a desired braking level based on a varied amount of pressurized air fluidly communicated to a trailer control pressure line on the tractor portion.

14. The system for transmitting a service brake control signal as set forth in claim 12, wherein:
the service brake control signal is a trailer service brake control signal; and
the brake is a trailer service brake on a trailer portion of the associated vehicle.

15. A method for controlling a pressure at a trailer control pressure line on a tractor portion of an associated vehicle, the controller comprising:
receiving a request to actuate a trailer service brake on a trailer portion of an associated vehicle;
transmitting a trailer control request signal transmitted in response to the request;
generating a first trailer service brake control signal based on the trailer control request signal; and
generating a second trailer service brake control signal based on a requested pressure included in the trailer control request signal, the requested pressure being up to a full pressure of pressurized air in an associated tractor reservoir on the tractor portion of the associated vehicle; and
transmitting the first trailer service brake control signal and the second trailer service brake control signal for controlling fluid communication of pressurized air from the associated tractor reservoir to the trailer control pressure line.

16. The method for controlling a pressure at a trailer control pressure line as set forth in claim 15, further including:
controlling the trailer service brake based on the pressure at the trailer control pressure line.

17. The method for controlling a pressure at a trailer control pressure line as set forth in claim 16, further including:
transmitting the pressure at the trailer control pressure line to a trailer control valve device on the trailer portion of the associated vehicle.

18. The method for controlling a pressure at a trailer control pressure line as set forth in claim 17, further including:
transmitting pressurized air from a trailer reservoir to the trailer service brake based on the pressure transmitted from the trailer control pressure line to the trailer control valve device, the trailer service brake being actuated based on the pressurized air transmitted from the trailer reservoir to the trailer service brake.

19. A system for controlling a pressure at a trailer control pressure line on a tractor portion of an associated vehicle and transmitting a service brake control signal, the system comprising:
a controller on the tractor portion of the associated vehicle, the controller including:
an input electrically communicating with a trailer control switch on the tractor portion;
a processor operatively coupled to the input;
a memory, operatively coupled to the processor, including control logic executable by the processor to:
process a trailer control request signal, received by the input from a trailer control switch, transmitted in response to the trailer control switch receiving a request to actuate a service brake of the associated vehicle;
generate a first trailer service brake control signal based on the trailer control request signal;
generate a second trailer service brake control signal based on a requested pressure included in the trailer control request signal, the requested pressure being up to a full pressure of pressurized air in an associated tractor reservoir on the tractor portion of the associated vehicle; and
generate the service brake control signal, based on at least one of i) the trailer control request signal and ii) the first trailer service brake control signal and the second trailer service brake control signal, for controlling the service brake of the associated vehicle; and
an output, operatively coupled to the processor, transmitting i) the first trailer service brake control signal and the second trailer service brake control signal for controlling fluid communication of pressurized air from the tractor reservoir to the associated trailer control pressure line and ii) the service brake control signal for controlling the service brake.

20. The system as set forth in claim 19, wherein:
the service brake control signal is a trailer service brake control signal; and
the service brake is a trailer service brake on a trailer portion of the associated vehicle.

* * * * *